United States Patent [19]

Blee

[11] 4,385,675

[45] May 31, 1983

[54] SPEED CONTROL ACTUATOR

[75] Inventor: Timothy J. Blee, Rugby, England

[73] Assignee: Associated Engineering Limited, Warwickshire, England

[21] Appl. No.: 191,032

[22] Filed: Sep. 25, 1980

[30] Foreign Application Priority Data

Sep. 28, 1979 [GB] United Kingdom ............... 7933755

[51] Int. Cl.$^3$ ............................................. B60K 31/00
[52] U.S. Cl. ..................................... 180/178; 123/361
[58] Field of Search ............... 180/179, 178, 170, 171; 123/361, 352, 350, 349

[56] References Cited

U.S. PATENT DOCUMENTS

| | | | |
|---|---|---|---|
| 1,604,936 | 10/1929 | Tabb et al. | 123/376 X |
| 3,580,355 | 5/1971 | Osaka et al. | 180/179 |
| 3,727,714 | 4/1973 | Ishikawa | 180/178 X |
| 4,163,432 | 8/1979 | Hertfelder | 123/361 X |
| 4,237,742 | 12/1980 | Barthruff | 180/179 X |
| 4,287,782 | 9/1981 | Ruschek | 180/179 X |

Primary Examiner—Joseph F. Peters, Jr.
Assistant Examiner—Milton L. Smith
Attorney, Agent, or Firm—Biebel, French & Nauman

[57] ABSTRACT

An actuator which forms part of speed control apparatus for controlling the forward speed of a vehicle, or the rotational speed of an engine, where it is desired to bring the speed control apparatus into operation at the discretion of the operator, has a reversible electric motor which receives a speed correction signal related to the difference between the actual speed and the desired speed. An electromagnetic clutch is provided which includes a rotor driven by the motor, and a clutch ring mounted via a spring from a pulley having a double-acting connection to the throttle lever of the engine. The clutch is energized on engagement of the speed control to bring the rotor and clutch ring into driving engagement, whereby the throttle lever is driven by the electric motor via the pulley and double-acting connection.

At any instant, the position of the clutch ring and pulley corresponds with that of the throttle lever. Therefore, as soon as the speed control is engaged, and the rotor and clutch ring are drivingly engaged, the throttle lever will be driven without delay by the reversible electric motor in accordance with the speed correction signal.

11 Claims, 3 Drawing Figures

SPEED CONTROL ACTUATOR

This invention relates to actuators, and more particularly to actuators forming part of speed control apparatus for controlling the forward speed of a land vehicle. It may also be applied to actuators forming part of speed control apparatus for controlling the rotational speed of a prime mover, for example a stationary reciprocating engine, where it is desired to bring the speed control apparatus into operation at the discretion of the operator.

One form of speed control apparatus for controlling the forward speed of a land vehicle is described in British Pat. No. 1,386,961.

It will be appreciated that one of the most common conditions in which the driver of a land vehicle may wish to engage the speed control is when cruising speed on a motorway or on an ordinary road is reached, and that, under these conditions the engine throttle (or equivalent) is in a position corresponding to a relatively high proportion of power output, the exact proportion depending on the vehicle. Comparable conditions may apply to the rotational speed control of a stationary prime mover.

Hitherto, such actuators when the speed control system was not engaged adopted a position corresponding to the throttle closed position (or equivalent), and therefore when the speed control was engaged, there was an inevitable time lag while the operative part of the actuator moved from the position corresponding to "throttle closed" to the position corresponding to the actual opening of the throttle at the moment of selecting engagement, before the control device began effectively to control the speed. One object of the present invention is to reduce or eliminate such a time lag.

According to the present invention, therefore, speed control apparatus includes an actuator comprising a reversible electric motor adapted to receive a speed correction signal of the speed control, the speed correction signal being related at least to the sign of the value of the difference between an actual speed and a desired speed, a first clutch member driven by said motor, a second clutch member having a double-acting connection connected, in operation, to a power control member of a prime mover to be controlled, and means operative on engagement of the speed control to load said first and second clutch members into driving engagement, whereby the second clutch member and double-acting connection and therefore, in operation, the power control member, are driven by the electric motor on engagement of said clutch members.

The invention also consists in a prime mover provided with speed control apparatus as just defined, and a vehicle provided with such prime mover.

It will be appreciated that, at any instant, the position of the second clutch member corresponds with that of the power control member, e.g. the throttle lever, and therefore as soon as the speed control is engaged, and the first and second clutch members loaded into engagement, the power control member will be driven without delay by the reversible electric motor in accordance with the speed correction signal.

One embodiment of the actuator will now be described, by way of example, with reference to the accompanying drawings, in which.

The actuator forms part of a vehicle speed control system, for example, such as that described in British Pat. No. 1,386,961.

Figure 1:
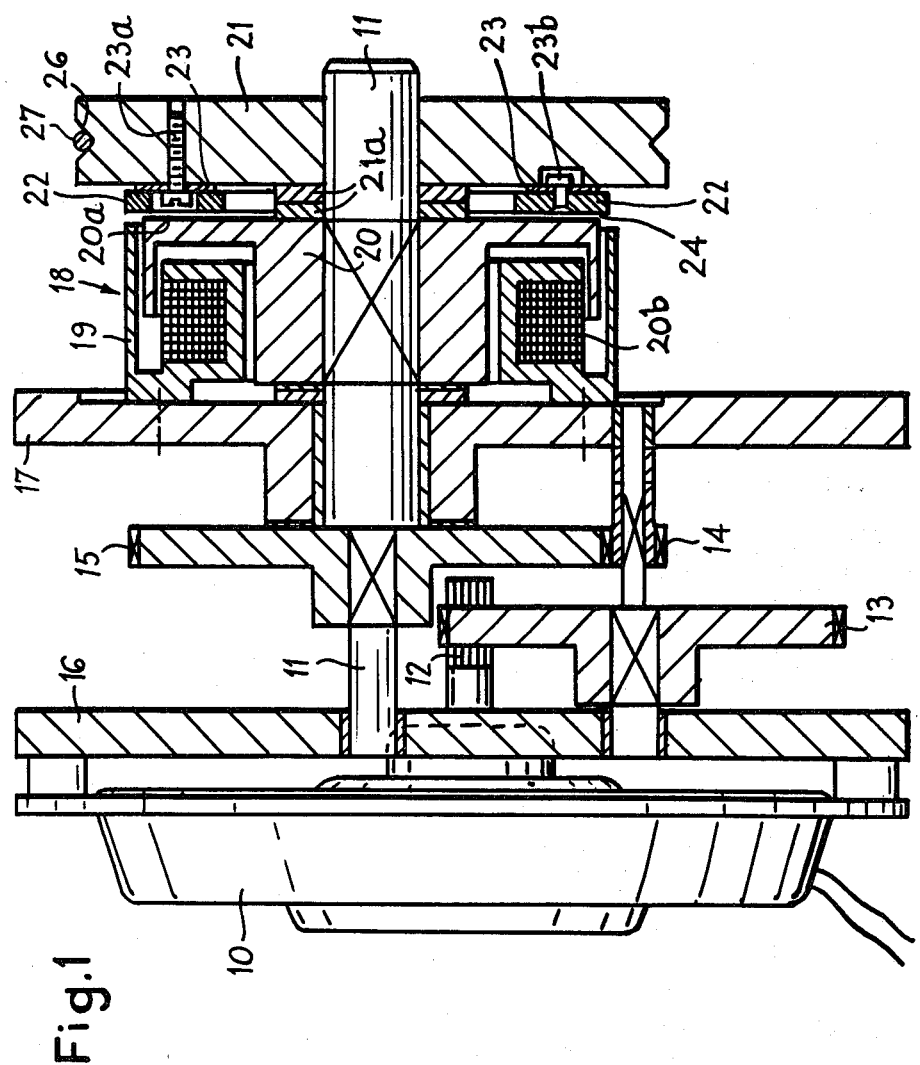
FIG. 1 is a section through the actuator.

As shown in FIG. 1, the actuator is driven by a reversible, variable-speed electric motor 10 which receives the correction signal (for example, the error signal due to the difference between the selected speed and the actual speed plus any rate term to allow for acceleration) from the comparator circuit of the speed control after electrical amplification. If the correction signal results from the actual speed of the vehicle being above the required speed stored in the speed control memory, the motor will be driven in the sense to close the throttle of the vehicle engine, and vice versa. The correction signal received by the motor is pulsed, and may either have a constant frequency and variable mark/space ratio, in which case the mark/space ratio is increased as the correction signal increases, or it may have a constant mark/space ratio and variable frequency, when the frequency is increased as the correction signal increases.

The motor 10 drives a shaft 11 via a train of reduction gears 12, 13, 14 and 15, giving a large speed reduction. The shaft 11 and the shafts of the reduction gears are journalled in suitable bearings in fixed mounting plates 16 and 17, the motor also being carried by the mounting plate 16.

An electromagnetic clutch 18 is disposed coaxially relative to the shaft 11, the clutch basically being of a known type, such as that available in the UK under the trade name "Simplatroll". The clutch includes a stator 19 fixed to the mounting plate 17 and an armature or rotor 20 fixed to the shaft 11 so as to be rotated thereby. The rotor 20 has an axial end face 20a, and the rotor with its end face form a first element or member of a friction clutch.

A pulley 21, which carries a second element or member of the friction clutch, is freely rotatably mounted on the shaft 11. The second clutch element or member comprises a ring 22 of magnetizable material disposed coaxially relative to the shaft 11, and mounted for axial and not rotational movement relative to an axial end face of the pulley 21. Mounting is achieved by an annular leaf spring 23 which is secured to the pulley 21 by circumferentially spaced screws, one of which is shown at 23a, and is secured to the ring 22 by rivets, one of which is shown at 23b, staggered circumferentially with respect to the screws 23a. When the clutch 18 is de-energised, the spring 23 biases the ring 22 axially towards the pulley 21 to the clutch-disengaged position shown, in which an air gap 24 exists between the end face 20a of the rotor and the adjacent end face of the ring 22. When the clutch windings 20b are energised, the rotor is magnetised, and the ring 22 is attracted to a clutch-engaged position against the end face 20a of the rotor, overcoming the biasing action of the spring 23, so that the ring 22 and therefore the pulley 21 will be locked to and rotate with the rotor 20 and shaft 11. The minimum separation between the pulley 21 and rotor 20 is limited by thrust washers 21a, and separation of the pulley from the shaft 11 is prevented by suitable retaining means (not shown).

Figure 2:
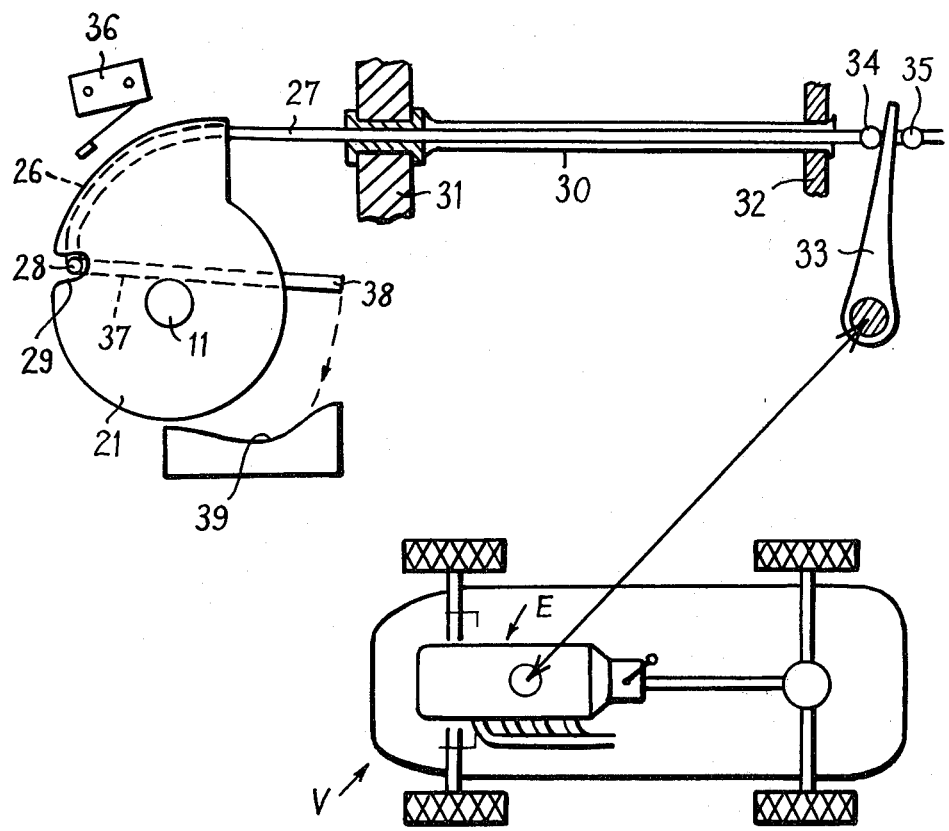
FIG. 2 is a schematic axial view of a modified version of the pulley shown in FIG. 1, and its associated double-acting connection to the power control member of the vehicle engine.

The pulley 21 has a circumferential groove 26 in which a cable 27 normally lies. The pulley 21 may be circular and the groove 26 may be continuous, as shown in FIG. 1, or alternatively, as shown in FIG. 2, the pulley 21 may be non-circular, and the groove 26 may be formed around a part only of the circumference of the pulley, for reasons which will be explained later. As shown in FIG. 2, the end of the cable 27 has a transverse member 28 which is normally received in a transverse slot 29 in the pulley 21.

The cable 27 slides in an outer housing 30 of the known Bowden cable kind, the outer housing 30 being secured in fixed parts 31, 32, of the vehicle at its two ends. The end of the cable 27 remote from the pulley 21 passes through the end of the throttle lever 33 of the vehicle's engine, the vehicle and engine being shown schematically at V and E respectively. The cable 27 has a nipple 34, 35 on each side of the lever 33 so that the end of the cable moves with the throttle lever in both directions of movement. As seen in FIG. 2, clockwise movement of throttle lever 33 reduces engine power and thus vehicle speed, and vice versa.

Thus rotation of the electric motor 10, when the clutch 18 is energised and engaged, causes the throttle lever 33 to be moved in the appropriate sense to restore the actual vehicle speed to the required speed stored in the speed control memory by the driver.

When the driver switches off, i.e. disengages the speed control, or if he should depress the brake pedal or clutch pedal of the car or select neutral (see "off signals" in FIG. 3), the clutch 18 is de-energised and disengaged, and the speed control ceases to operate to control vehicle speed.

If the driver switches on the speed control, i.e. engages the speed control or causes it to resume engagement after a period of temporary disengagement (see "on signals" in FIG. 3), and the driver wishes to accelerate above the pre-set speed by use of the accelerator pedal, this will cause the throttle lever 33 to move anti-clockwise as seen in FIG. 2, by means of the normal control linkage, pushing the cable 27 through its outer housing 30 so that it bows out from the pulley 21 and strikes a micro-switch 36 mounted close to, and in appropriate relation to, the pulley. This is arranged to de-energise and therefore disengage the clutch 18 and thus to render the speed control inoperative.

The pulley 21 is provided with a substantially diametral hole 37 which terminates in the transverse slot 29, and the hole contains a sliding pin 38, and a cam is provided in a fixed relation to the axis of the pulley 21 and to the fixed plates 16 and 17 and fixed part 31 and affording a cam surface 39.

When the electric motor 10 drives the clutch rotor 20 in the direction to close the throttle (i.e. to rotate throttle lever 33 clockwise as seen in FIG. 2), and should the friction faces of the rotor 20 and ring 22 have failed to disengage for any reason, then if the pulley 21 is rotated beyond the position corresponding to the throttle-closed setting, the sliding pin 38 will be pushed through the hole 37 by the cam surface 39, and will push the transverse member 28 out of the slot 29, thus disengaging the throttle lever 33 from the pulley 21 and enabling the driver to resume control of vehicle speed by means of the accelerator and brake.

As previously mentioned, the part of the pulley 21 formed with groove 26 may be an arc of a circle, or it may be non-circular to suit the throttle response characteristics of the engine. Pulleys of different characteristics may be used for different vehicles, the remainder of the actuator remaining the same.

It will be appreciated that the pulley 21, when the speed control is not in operation, follows the movement of the throttle lever 33. Thus, when the driver engages the speed control, the clutch 18 is energised and engaged, and the pulley 21 is instantly clamped to the clutch rotor 20 via the ring 22, thus coming under control of the electric motor 10 driven by the error signal, i.e. a signal representing the difference between memory speed and actual speed. When the speed control is normally switched on, this difference will be small. The speed of response is therefore good.

Figure 3:
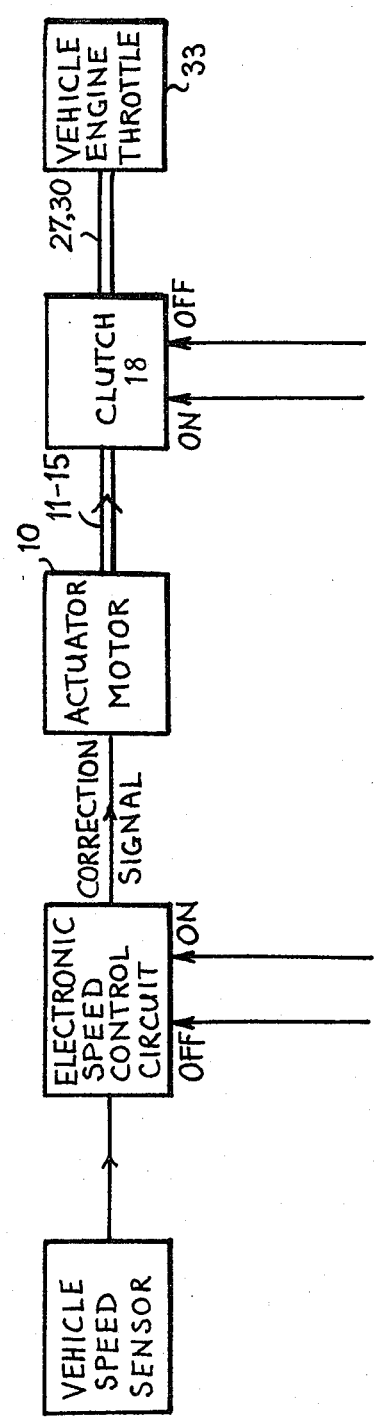
FIG. 3 is a block diagram of a vehicle speed control system incorporating an actuator embodying the invention.

FIG. 3 is a block schematic diagram of a vehicle speed control system incorporating an actuator embodying the invention. The single lines connected to the blocks represent electrical connections, whilst the double lines represent mechanical connections. The general arrangement and principles of operation of this system will be apparent from the foregoing description.

The actuator according to the invention can be simple and cheap to manufacture. Moreover, since it is electrically driven it overcomes a disadvantage of the vacuum actuator hitherto used, namely the disadvantage that, on normally aspirated engines as commonly used in motor vehicles, the pressure difference between manifold vacuum and atmospheric pressure, on which the operation of the actuator depends, virtually disappears as the throttle approaches the fully open position.

It will be understood that various modifications may be made without departing from the scope of the present invention as defined in the appended claims.

For example, since, in the embodiment of FIG. 1, the clutch, when de-energised, is positively disengaged by the spring 23, the cable release arrangement 37, 38, 39 in FIG. 2 may be omitted, although it could be replaced by alternative means for disengaging the clutch or disengaging the actuator from the throttle lever or equivalent in the event of malfunction of the actuator or speed control. The Bowden cable type double-acting connection shown in FIG. 2 may be replaced by any other suitable connection between the actuator and engine.

If the rotor 20 of the electromagnetic clutch 18 turns through a limited angle, e.g. 180°, the coil 20b may be made integral with the rotor, the electrical connection being of suitable length and disposition to accommodate this rotation.

The clutch and/or its means of actuation, the drive connection between the motor and clutch, the connection between the clutch and Bowden cable double-acting connection, and/or the double acting connection itself, may take a variety of different forms. For example, the clutch may be a mechanical device in which clutch members are loaded into clutching engagement by means of a lever, the lever being displaced to its clutch-engaging position by means of an actuator, such as an electromagnetic linear actuator or solenoid. The second clutch member may comprise the pulley or equivalent connected to the double acting connection, instead of an intermediate member or ring drivingly connected to the pulley or equivalent.

I claim:

1. Vehicle speed control apparatus, wherein the vehicle is driven by a prime mover having a power control member, said apparatus including an actuator comprising a reversible electric motor adapted to receive a speed correction signal generated by a speed control system, the speed correction signal being related at least to the sign of the value of the difference between an actual speed and a predetermined desired vehicle speed, a first clutch member driven by said motor, a second clutch member normally permanently connected by a double-acting connection to said power control member of the prime mover whereby, at any instant, the position of said second clutch member will correspond to the position of said power control member, and means operative on engagement of the speed control to apply the speed correction signal to drive the electric motor and to load said first and second clutch members into driving engagement at the position of the clutch member corresponding to the instantaneous position of the power control member to drive the second clutch member and double-acting connection and the power control member until the vehicle speed reaches the predetermined desired speed.

2. Apparatus as claimed in claim 1, wherein the second clutch member drives a pulley having a circumferentially extending peripheral groove, the double-acting connection including a cable having an end fixed with respect to the pulley, a portion adjacent said end extending around the pulley and engaged in the groove, and being connected at a point remote from said end to the power control member of the prime mover.

3. Apparatus as claimed in claim 2, wherein the grooved periphery of the pulley is circular.

4. Apparatus as claimed in claim 2, wherein the portion of the cable is engaged in a grooved peripheral zone of the pulley which is non-circular.

5. Apparatus as claimed in claim 2, wherein the clutch is an electromagnetic clutch having a rotor fixed to a shaft drivingly connected to the motor, and the second clutch member and pulley are rotatably mounted on the shaft, the second clutch member being displacable axially into clutching engagement with the rotor when the clutch is energised, and being connected to the pulley via spring means which bias the second clutch member axially away from the rotor when the clutch is de-energised.

6. Apparatus as claimed in claim 2, including means to cause the actuator to relinquish control of the double-acting connection upon occurrence of a malfunction of the apparatus and to permit the control of the apparatus to be overridden.

7. Apparatus as claimed in claim 1, wherein the clutch is provided with electromagnetic actuating means, the clutch being disengaged when the electromagnetic means is de-energised, and engaged when the electromagnetic means is energised.

8. In speed control apparatus including means for generating a speed correction signal related at least to the sign of the value of the difference between an actual speed and a predetermined desired speed, an actuator comprising: a reversible electric motor connectable to receive said speed correction signal;
first means in permanent driving connection with said motor and including a first clutch surface;
second means selectively drivingly engageable and disengageable relative to said first means and including a second clutch surface, a pulley in permanent driving connection with said second clutch surface and having a circumferentially extending peripheral groove, a cable having an end fixed with respect to said pulley, a cable portion adjacent said end extending around said pulley and engaged in said groove, and means connecting the opposite end of the cable to a displaceable power control member of a prime mover to be controlled, said cable forming a double-acting connection between and normally permanently interconnecting said pulley and power control member whereby, at any instant, the rotated position of said second clutch surface and pulley will correspond to the position of said power control member; and
means operative on engagement of the speed control to connect the speed control signal to drive the electric motor and to change said first and second clutch surfaces from a mutually declutched condition in which said second means is free to move with and is driven by said power control member, to a mutually clutched condition at the rotated position of said second clutch surface and pulley corresponding to the instantaneous position of said power control member in which said second means, and therefore said power control member, are driven by said electric motor via the clutched first and second clutch surfaces to the position corresponding to said predetermined desired speed.

9. Apparatus as claimed in claim 8, wherein said first means includes a shaft in permanent driving connection with said electric motor, said first clutch surface being carried by a first clutch member fixed to said shaft and said second clutch surface being carried by a second clutch member fixed to said pulley, said pulley being freely rotatably supported by said shaft with said second clutch member disposed adjacent said first clutch member and displaceable axially relative to the latter.

10. Apparatus as claimed in claim 9, wherein said first means includes reduction gearing adapted to reduce the speed of said shaft by a large amount relative to the speed of said motor.

11. In a land vehicle including: an engine operable to drive the vehicle, the engine having an adjustable throttle for controlling the speed of the engine and therefore the speed of the vehicle; an accelerator pedal permanently connected to said throttle, a speed control system including speed control circuitry operable to generate a speed correction signal which varies in dependence upon the difference between a predetermined required forward speed of the vehicle and the actual forward speed of the vehicle, means for selectively engaging and disengaging said speed control system to control the vehicle speed, an actuator controlled by said speed correction signal and connected to said throttle; and means operative on engaging the speed control system to connect the speed correction signal to control said actuator, whereby the throttle is selectively displaceable by the accelerator pedal and by said speed control system when the latter is engaged; the improvement wherein the actuator includes:
(a) a reversible electric motor, at least the direction of rotation of which is controlled by said speed correction signal;
(b) a clutch including first and second rotatable members and clutch actuating means operable to cause said first and second clutch members to become drivingly engaged when said speed control system is engaged, and to become drivingly disengaged when said speed control system is disengaged;
(c) reduction gearing permanently drivingly interconnecting said electric motor and said first clutch member, whereby rotation of the electric motor produces, via the reduction gearing, relatively fine angular adjustment of said first clutch member; and (d) a bidirectionally-acting connection normally permanently interconnecting said throttle and second clutch member, whereby, when said speed control system is disengaged, displacement of the throttle in a throttle-opening direction correspondingly rotates said second clutch member in one direction independently of said first clutch member, and displacement of the throttle in a throttle-closing direction correspondingly rotates said second clutch member in the reverse direction independently of said first clutch member;

whereby, at any instant, the rotated position of said second clutch member will correspond to the position of said throttle, and immediately upon said speed control system being engaged said first and second clutch members are drivingly interengaged at the rotated position of said second clutch member corresponding to the instantaneous position of said throttle, and the electric motor will be controlled by the speed correction signal to rotate the two clutch members together to displace the throttle to the position for driving the vehicle at the predetermined required forward speed.

* * * * *

UNITED STATES PATENT AND TRADEMARK OFFICE
CERTIFICATE OF CORRECTION

PATENT NO. : 4,385,675
DATED : May 31, 1983
INVENTOR(S) : Timothy John Blee

It is certified that error appears in the above—identified patent and that said Letters Patent is hereby corrected as shown below:

On the Title page, under Assignee:

"Associated Engineering Limited" should be --AE PLC--.

Signed and Sealed this

Eighteenth Day of October 1983

[SEAL]

Attest:

GERALD J. MOSSINGHOFF

*Attesting Officer*  *Commissioner of Patents and Trademarks*